United States Patent [19]

Haruna et al.

[11] Patent Number: 4,917,710
[45] Date of Patent: Apr. 17, 1990

[54] PROCESS FOR RECOVERING OXYGEN ENRICHED GAS

[75] Inventors: Kazuo Haruna, Hyogo; Kanji Ueda, Osaka; Masahiro Inoue, Hyogo; Hitosi Someda, Yachiyo, all of Japan

[73] Assignee: Sumitomo Seika Chemicals Co., Ltd., Hyogo, Japan

[21] Appl. No.: 313,887

[22] Filed: Feb. 23, 1989

[30] Foreign Application Priority Data

Mar. 17, 1988 [JP] Japan .................................. 63-65197

[51] Int. Cl.$^4$ .................................................. B01D 53/04
[52] U.S. Cl. ............................................. 55/26; 55/58; 55/62; 55/68; 55/75
[58] Field of Search ................... 55/25, 26, 58, 62, 68, 55/75

[56] References Cited

U.S. PATENT DOCUMENTS

| | | | |
|---|---|---|---|
| 3,142,547 | 7/1964 | Marsh et al. | 55/26 |
| 3,788,036 | 1/1974 | Lee et al. | 55/25 |
| 3,923,477 | 12/1975 | Armond et al. | 55/25 |
| 4,160,651 | 7/1979 | Pivard | 55/26 |
| 4,440,548 | 4/1984 | Hill | 55/26 |
| 4,494,966 | 1/1985 | Umeki | 55/26 |
| 4,519,813 | 5/1985 | Hagiwara et al. | 55/26 |
| 4,684,377 | 8/1987 | Haruna et al. | 55/62 X |
| 4,781,735 | 11/1988 | Tagawa et al. | 55/26 |

FOREIGN PATENT DOCUMENTS

| | | | |
|---|---|---|---|
| 59-199503 | 11/1984 | Japan . | |
| 60-027606 | 2/1985 | Japan | 55/25 |
| 60-132620 | 7/1985 | Japan | 55/25 |
| 1572532 | 7/1980 | United Kingdom . | |

*Primary Examiner*—Robert Spitzer

[57] ABSTRACT

A process for recovering an oxygen enriched gas from a mixed gas mainly composed of nitrogen gas and oxygen gas by means of PSA comprising:
  providing two adsorbers A and B packed with zeolite molecular sieve as the adsorbent and a gas reservoir for accumulating the recovered oxygen enriched gas which is connected to the outlet side of each adsorber and used in common to both adsorbers, introducing the mixed gas into adsorber A to adsorb nitrogen gas, and desorbing nitrogen has previously adsorbed in adsorber B therefrom under reduced pressure.

Introduction, adsorption and desorption are carried out according to adsorption, desorption, rinsing, recovering, pressure accumulation and pressurization steps in turn with alternation of adsorbers A and B.

8 Claims, 5 Drawing Sheets

STEP - 4
3 sec.

STEP - 5
15 sec.

PROCESS FOR RECOVERING OXYGEN ENRICHED GAS

FIELD OF THE INVENTION

The present invention relates to a process for recovering an oxygen enriched gas from a mixed gas mainly composed of nitrogen gas and oxygen gas by means of Pressure Swing Adsorption (hereinafter referred to as PSA).

BACKGROUND OF THE INVENTION

Oxygen gas obtained by PSA has been widely utilized in various industrial fields wherein a large amount of oxygen is used continuously, for example, electric furnace steel manufacturing, oxygen aeration for water treatment, bleaching of pulp, smelting furnace manufacturing, ozone generation and the like, and PSA has been generalized increasingly as a process for readily supplying oxygen at low costs.

As a conventional technique for producing an oxygen enriched gas by PSA, there has been predominantly employed a process which is designed to obtain an oxygen enriched gas in a high yield by providing three or four adsorbers and repeating respective steps for adsorption, recovery, desorption, pressurization, etc. in turn. Then, although a request has been made to obtain a definite amount of an oxygen enriched gas by using a less amount of an adsorbent with a simplified apparatus, it is very difficult to fulfill such a request, practically.

In order to realize such a request, PSA using two adsorbers is proposed. For example, Japanese Patent Kokai No. 59-199503 discloses a process wherein a relatively high yield of an oxygen enriched gas such as about 35% can be attained by incorporating pressure equalization. However, in this process, oxygen concentration in the resulting oxygen enriched product gas is as low as 45%. To the contrary, when oxygen concentration in the product gas is raised up to 90%, the yield is decreased to 20%. Therefore, it has been considered that there is a limit to obtain an oxygen enriched gas having a high oxygen concentration in a high yield by PSA using two adsorbers. That is, in PSA using two adsorbers, enough time can not be spent for pressurization to an adsorption pressure with an oxygen enriched gas in a pressurizing step as a pretreatment of an adsorption step in comparison with PSA using three or four adsorbers. As the result, a raw material mixed gas is fed to an adsorber before the pressure is sufficiently raised in the pressurizing step, which results in a high inflow rate of the raw material gas. Therefore, nitrogen gas is not sufficiently adsorbed by an adsorbent and adsorption break-through of nitrogen gas is liable to occur. In order to prevent this, as disclosed in the above Japanese Patent Kokai No. 59-199503, there is employed a method such that a feeding rate of a raw material gas is limited to 0.5 to 1.5 Nm³/H per 1 kg of an adsorbent. However, as far as pressurization is effected only by a raw material gas, the problem of adsorption break-through of nitrogen gas is unavoidable.

OBJECTS OF THE INVENTION

Under these circumstances, in order to solve the above problem, the present inventors have intensively studied PSA using two units which is economically advantageous. As the result, it has been found that the above adsorption break-through of nitrogen gas can be prevented by providing a gas reservoir of an oxygen enriched gas at the outlet of the adsorber and flowing backward a part of the oxygen enriched gas from the gas reservoir when the residual gas in the adsorber is recovered or a raw material mixed gas is introduced.

That is, the main object of the present invention is to provide an improved process for obtaining an oxygen enriched gas having oxygen concentration of 90% or more in a high yield by means of PSA using two adsorbers, which has been considered to be difficult to realize.

This object as well as other objects and advantages of the present invention will become apparent to those skilled in the art from the following description with reference to the accompanying drawings.

SUMMARY OF THE INVENTION

Figure 1:
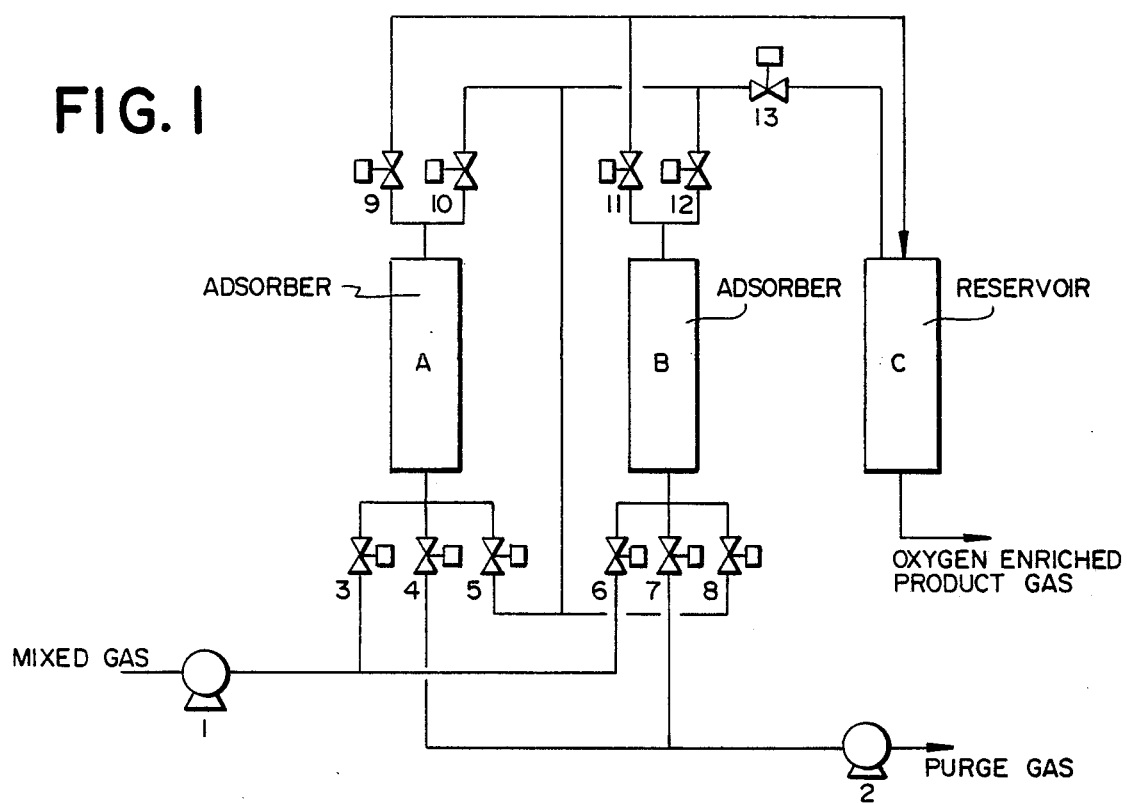
FIG. 1 is a gas flow sheet illustrating a preferred example of apparatus used in a low pressure process of the present invention.

According to the present invention, there is provided a process for recovering an oxygen enriched gas from a mixed gas mainly composed of nitrogen gas and oxygen gas by means of PSA which comprises:

providing two adsorbers A and B packed with zeolite molecular sieve as the adsorbent and a gas reservoir for accumulating the recovered oxygen enriched gas which is connected to the outlet of each adsorber and used in common to both adsorbers, introducing the mixed gas into adsorber A to adsorb nitrogen gas, and desorbing nitrogen gas previously adsorbed in adsorber B therefrom under reduced pressure, said introduction, adsorption and desorption being carried out according to the following six steps:

(1) introducing the mixed gas through the inlet of adsorber A and selectively adsorbing nitrogen gas, while accumulating the resulting oxygen enriched gas in the reservoir through the outlet of adsorber A;

(2) desorbing nitrogen gas through the inlet of adsorber B;

(3) flowing a part of the oxygen enriched gas in the reservoir for rinsing backward to the outlet of the adsorber B wherein desorption of nitrogen gas is being continued;

(4) after stopping introduction of the mixed gas into adsorber A, introducing a part of the residual oxygen enriched gas in adsorber A into the outlet of adsorber B through the outlet of adsorber A to recover the oxygen enriched gas;

(5) introducing the residual gas in adsorber A into the inlet of adsorber B wherein desorption has been completed through the outlet of adsorber A to recover oxygen enriched gas, while flowing a part of the oxygen enriched gas backward to the outlet of adsorber B to accumulate pressure; and (6) flowing a part of the oxygen enriched gas backward to the outlet of adsorber B and, while introducing the mixed gas into the inlet of adsorber B to effect pressurization, and repeating these six steps in turn with alternation of adsorbers A and B.

DETAILED DESCRIPTION OF THE INVENTION

The gas reservoir of the oxygen enriched gas which is used in common to both adsorbers and is connected to the outlets of respective adsorbers A and B is usually composed of one tank. However, if desired, it may be composed of plural tanks. And, it is required that the total volume of the gas reservoir is at least one half as much as that of one adsorber.

One of the characteristics of the present invention is to prevent adsorption break-through of nitrogen gas at the outlet part of the adsorber by flowing a part of the oxygen enriched gas accumulated in the gas reservoir backward to the adsorber for a short period of time in the pressure accumulating and pressurizing steps to increase oxygen concentration in the oxygen enriched product gas. Further, in the pressure accumulating step wherein the residual oxygen is recovered from the outlet of the adsorber in which adsorption has been completed and led into the inlet of the other adsorber in which desorption has been completed, movement of nitrogen gas toward the outlet of the former adsorber can be suppressed by flowing a part of the oxygen enriched gas in the gas reservoir backward thereto and, therefore, the yield of the oxygen enriched product gas can be increased by effecting pressure equalization sufficiently to recover the oxygen enriched gas. This is another characteristic of the present invention.

In practice, it is advantageous to carry out the process of the present invention either by low pressure process wherein the mixed gas is introduced into the adsorber at a pressure between atmospheric pressure and less than 2 $kg/cm^2G$ and desorption is effected under reduced pressure between 100 mmHg and 400 mmHg, or high pressure process wherein the mixed gas is introduced into the adsorber at a pressure between 2 $kg/cm^2G$ and 8 $kg/cm^2G$ and desorption is effected by releasing the pressure to the atmospheric pressure.

Specifically, the process of the present invention is carried out as follows.

Two adsorbers, A and B, packed with an adsorbent such as zeolite molecular sieve which can selectively adsorb nitrogen gas, and one or more common gas reservoir tanks of the oxygen enriched gas connected to the both adsorbers with a conduit at the outlet of the respective adsorber are provided, and the mixed gas mainly composed of nitrogen gas and oxygen gas is pressurized with a blower or compressor and introduced into one of the adsorbers (e.g., adsorber A). In this case, according to the low pressure process, the mixed gas is pressurized between atmospheric pressure and less than 2 $kg/cm^2G$, and the other adsorber (e.g., adsorber B) is desorbed and regenerated by reducing a pressure to 100 mmHg to 400 mmHg with a vacuum pump. According to the high pressure process, the mixed gas is pressurized to 2 $Kg/cm^2G$ to 8 $kg/cm^2G$ and is introduced into adsorber A to effect adsorption and adsorber B is desorbed and regenerated by releasing it in the atmosphere. In either operation, for rinsing, a part of the accumulated oxygen enriched gas is flowed backward from the gas reservoir during 10 to 30 seconds at the end of the desorption step. The flow rate is preferably 1.2 to 3.5 times as much as that of the oxygen enriched gas drawn from the gas reservoir as the product gas. When the flow rate is too small, desorption and regeneration are not sufficiently effected and, thereby, oxygen concentration in the resulting oxygen enriched product gas is lowered. To the contrary, when the flow rate is too large, the amount of the oxygen enriched product gas is decreased.

Then, the outlet of adsorber A in which adsorption has been completed is connected to the outlet of adsorber B in which desorption is being effected under reduced pressure to recover the residual oxygen enriched gas at the upper part of adsorber A and to lead it to adsorber B. In this case, the amount of the recovered gas should be controlled adequately. When this residual gas is recovered excessively, oxygen concentration in the oxygen enriched product gas is lowered. In order to obtain the oxygen enriched gas in a maximum yield, it is necessary to keep the rise of pressure rise of adsorber B at not more than 200 mmHg in the case of low pressure process or not more than 0.5 $kg/cm^2G$ in the case of high pressure process.

However, this recovery step is not necessarily required and this step can be omitted. Even in such a case, the operation may be carried out without significant decrease in a recovery. Particularly, since decrease in a recover rate in high pressure process is generally smaller than that of low pressure process, this recovery step can be omitted to simplify the operation step in high pressure process.

At the next step, the residual gas in adsorber A is recovered by continuously releasing the gas from the outlet thereof and leading it to the inlet of adsorber B. At the same time, a part of the oxygen enriched gas is flown backward from the gas reservoir to the outlet of adsorber B to accumulate pressure. In order to obtain a maximum recovery rate by both low pressure and high pressure processes, the pressures of both adsorbers should be made almost equal. That is, it is necessary to conduct the recovery until the difference between respective pressures substantially becomes zero.

Then, the adsorption operation is started by introducing the mixed gas from the inlet of adsorber B. At this time, the pressure of adsorber B is still lower than a final adsorption pressure and, therefore, the mixed gas rapidly flows into the adsorber. As the result, a part of nitrogen gas breaks through the adsorbent before it is sufficiently adsorbed in adsorbent, which results in lowering of oxygen concentration in the product gas. In order to prevent this, adsorber B is pressurized through the inlet thereof by flowing backward the oxygen enriched gas from the gas reservoir to the outlet thereof subsequent to the pressure accumulating step. The oxygen enriched gas can not flow out from the outlet of adsorber B to the gas reservoir until adsorber B is pressurized gradually and the pressure is equalized to that of the gas reservoir. This operation is one of the most important steps of the present invention and such a novel operation with pressurizing by flowing backward the oxygen enriched gas is has never been employed. In the case of the present invention, the oxygen enriched gas continues to flow backward until the pressure of the gas reservoir is equalized to that of the adsorber and, therefore, the amount of the gas to be flowed backward varies depending upon a volume of the gas reservoir.

Accordingly, in order to obtain a maximum effect of this operation, preferably, the volume of the gas reservoir of the oxygen enriched gas is the same as or more than that of one adsorber. When this volume is smaller than half (½) of the adsorber, this is not preferred because the amount of the oxygen enriched gas to be flowed backward from the gas reservoir to the adsorber is decreased and, when the mixed gas is introduced into the adsorber, the break-through amount of nitrogen gas in the adsorbent layer increases to lower oxygen concentration in the oxygen enriched gas. To the contrary, when the volume is too large, any further advantages can not be expected. Therefore, preferably, the volume of the gas reservoir is the same as that of the adsorber.

The mixed gas mainly composed of nitrogen gas and oxygen gas of the present invention is usually air. However, the process of the present invention can be also applied for recovering an oxygen enriched gas from a waste gas having relatively high oxygen concentration.

PREFERRED EMBODIMENTS OF THE INVENTION

Hereinafter, the preferred embodiments of the present invention are explained in detail with reference to the accompanying drawings.

FIG. 1 is a gas flow sheet illustrating a preferred example of apparatus used in a low pressure process of the present invention, wherein a vacuum pump is used.

Figure 2:
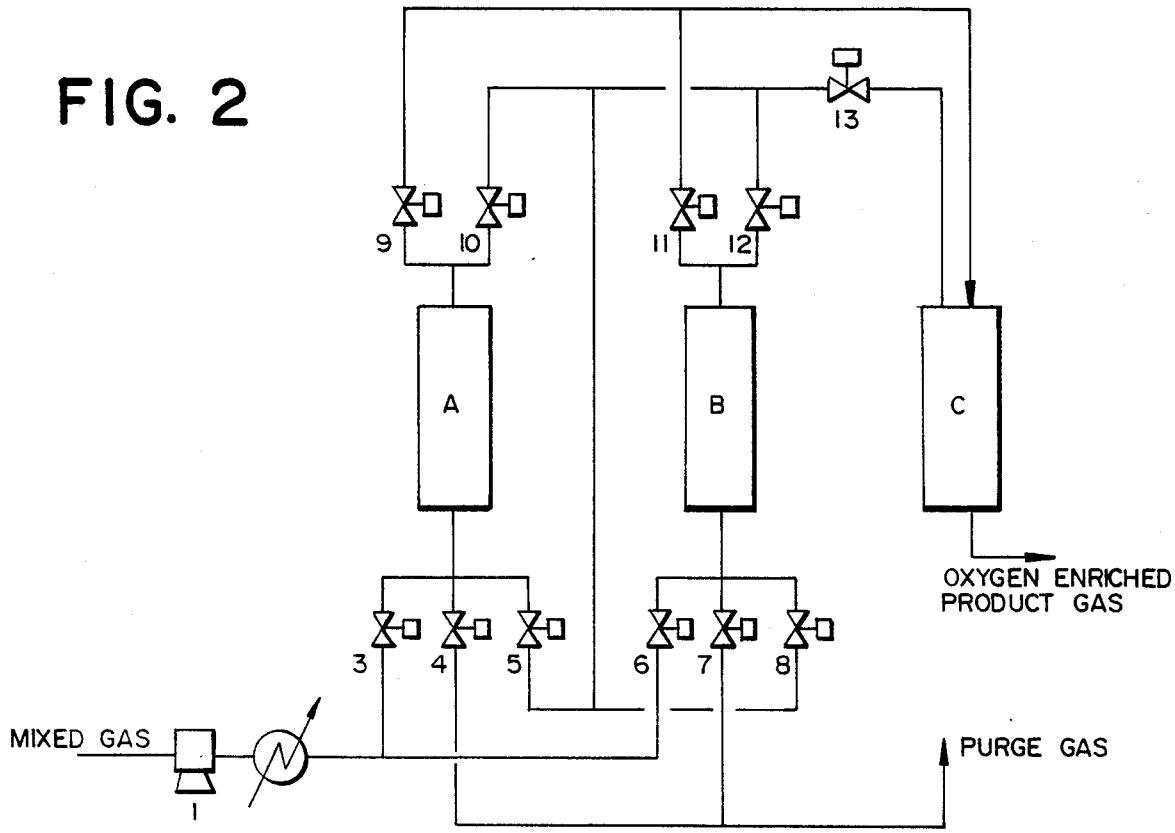
FIG. 2 is a gas flow sheet illustrating a preferred example of apparatus used in a high pressure process of the present invention.
Figure 3A:
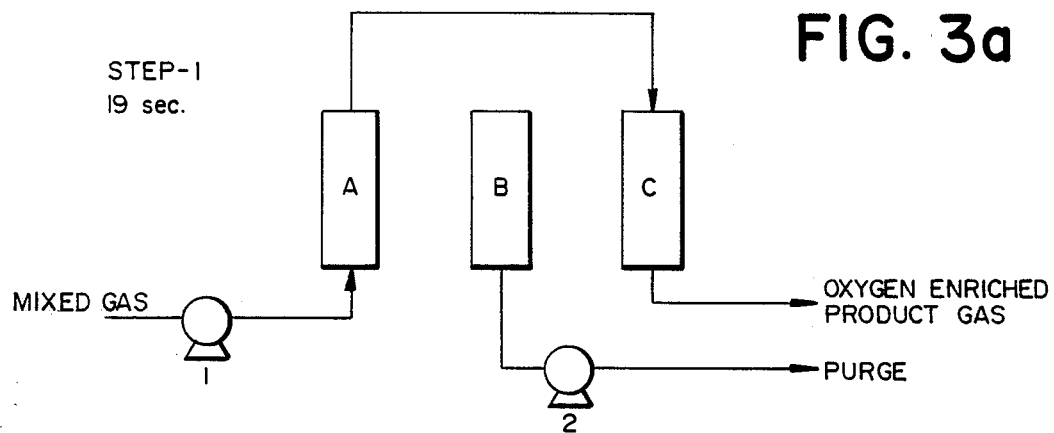
FIGS. 3a to 3e are operation steps illustrating one preferred embodiment of the process of the present invention wherein the apparatus shown in FIG. 1 is used.
Figure 3B:
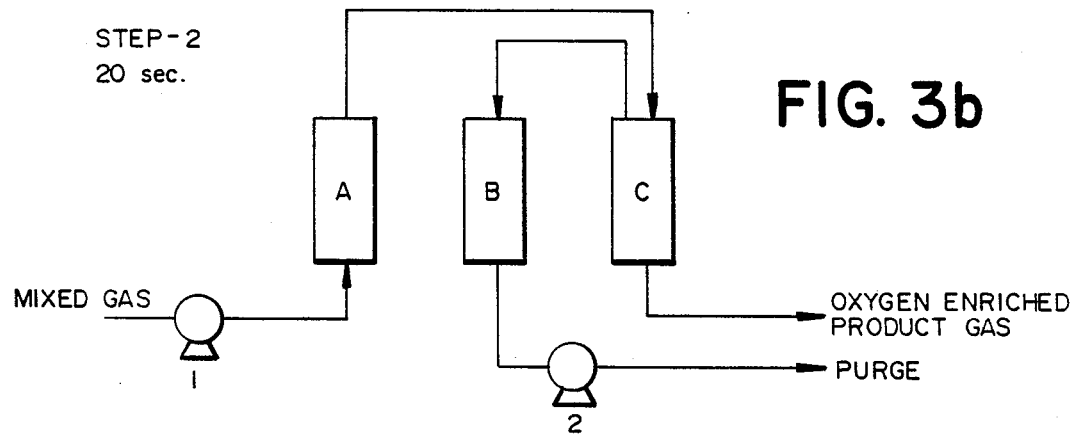
Figure 3C:
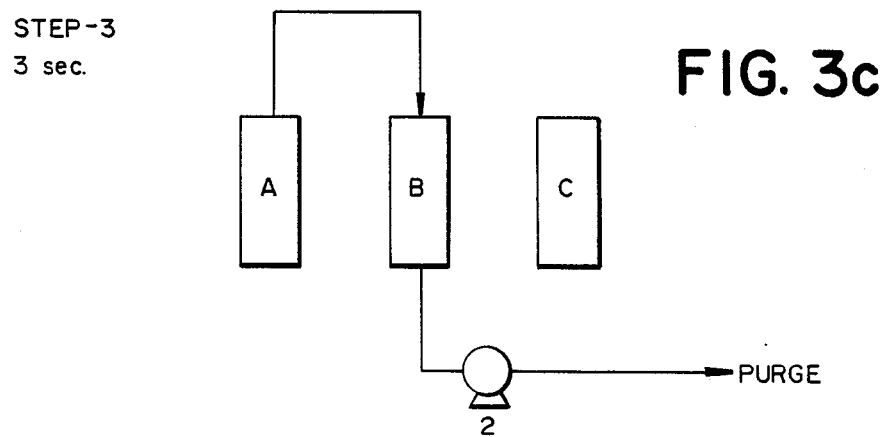
Figure 3D:
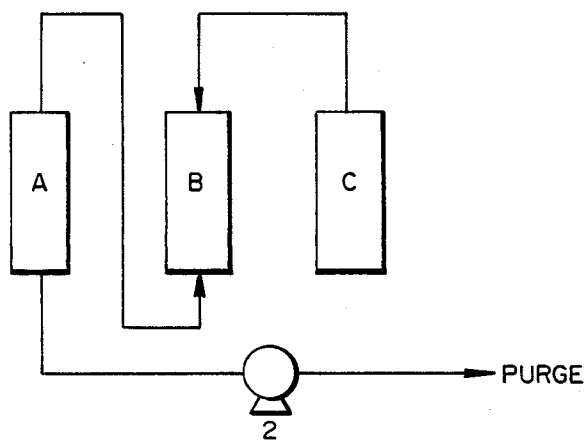
Figure 3E:
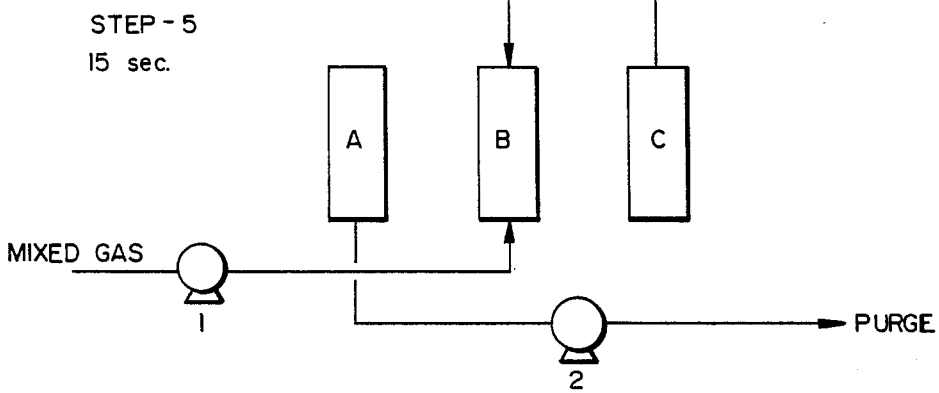
Figure 4A:
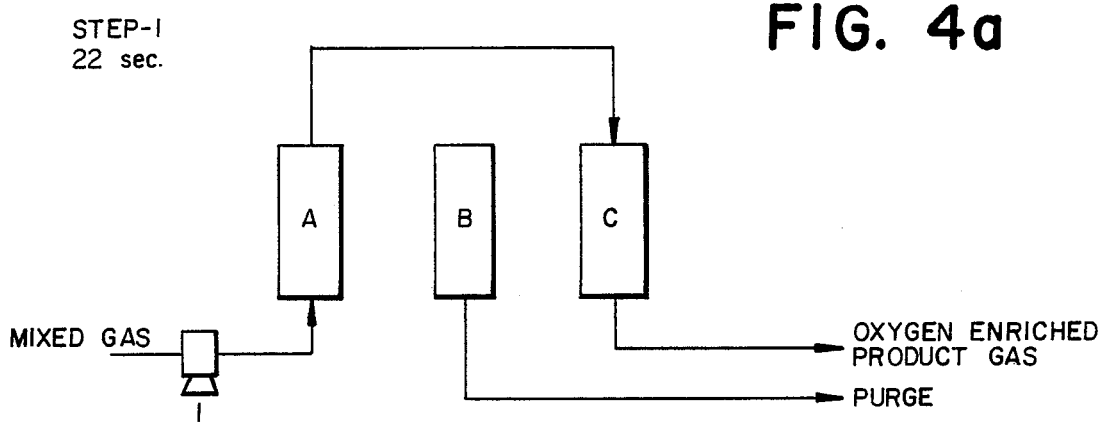
FIGS. 4a to 4e are operation steps illustrating one preferred embodiment of the process of the present invention, wherein the apparatus shown in FIG. 2 is used.
Figure 4B:
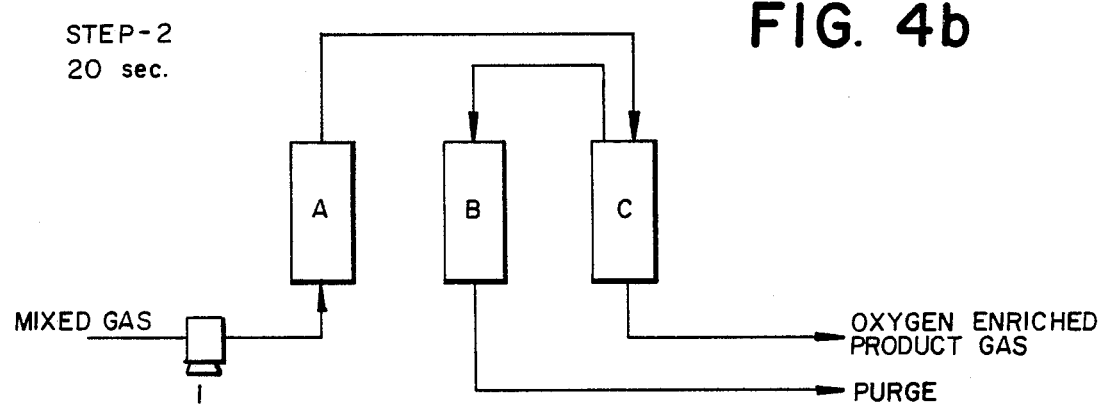
Figure 4C:
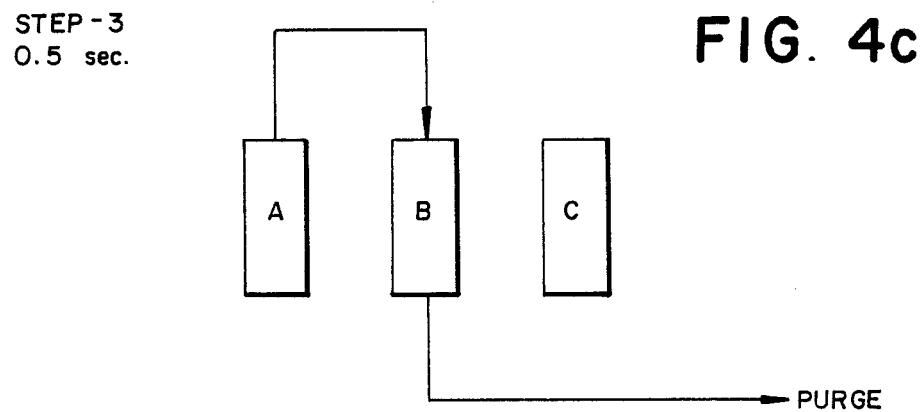
Figure 4D:
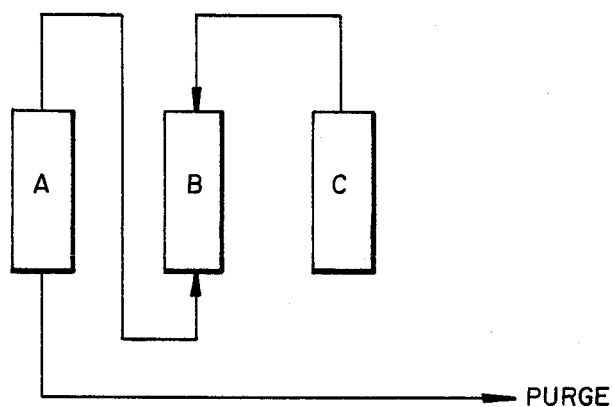
Figure 4E:
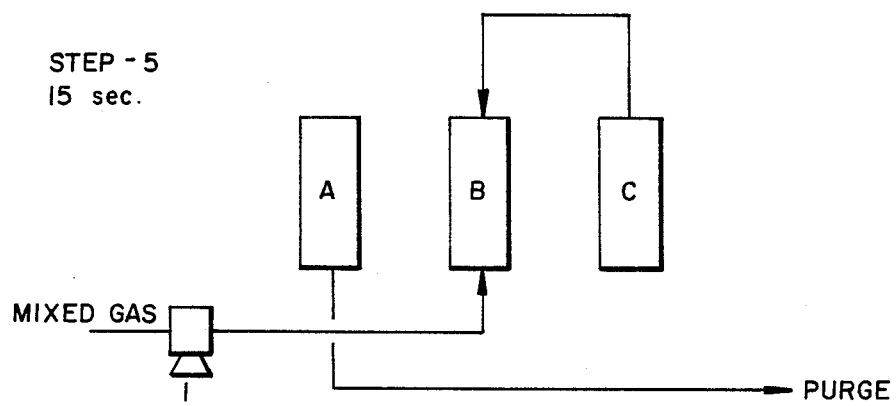

FIG. 2 is a gas flow sheet illustrating a preferred example of apparatus used in a high pressure process of the present invention, wherein a vacuum pump is not used.

In FIGS. 3a to 3e and 4a to 4e, the operation steps thereof are illustrated, respectively.

(1) Low pressure process

Each operation step is explained with reference to FIGS. 1 and 3a to 3e.

Step-1

The mixed gas is pressurized to 500 mm water column gauge with an air blower 1 and introduced into adsorber A packed with zeolite molecular sieve through a valve 3. Then, nitrogen gas is removed by adsorption to enrich oxygen gas and the resulting oxygen enriched gas is accumulated in a gas reservoir C through a valve 9. On the other hand, in adsorber B wherein adsorption has been completed, nitrogen gas is desorbed and the adsorbent is regenerated by reducing pressure to 180 mmHg through a valve 7 with a vacuum pump 2.

Step-2

For about 10 to 30 seconds at the end of the desorption step in adsorber B, it is rinsed by flowing backward a part of the oxygen enriched gas in a flow rate of 1.2 to 3.5 times as much as that of the oxygen enriched product gas drawn from the gas reservoir C through valves 12 and 13.

Step-3

A part of the residual oxygen gas in adsorber A wherein adsorption has been completed is recovered and led to an outlet of adsorber B through the valves 10 and 12. At this time, adsorber B is still being desorbed continuously with the vacuum pump 2. Preferably, the recovery is carried out so that the final pressure of adsorber B is controlled to 330 mmHg, that is, the pressure is raised from 180 mmHg by 150 mmHg. When recovery is effected until the pressure increment exceeds 200 mmHg, the excess amount of nitrogen gas flows into adsorber B from adsorber A and it is adsorbed to the adsorbent at a proximal part to the outlet of adsorber B and adsorber B is contaminated. Therefore, this is not preferred because lowering of oxygen concentration in the oxygen enriched gas is caused in the subsequent steps.

Step-4

The residual oxygen enriched gas in adsorber A is recovered to the inlet of adsorber B through valves 10 and 8. At the same time, a part of the oxygen enriched gas is flowed backward from the gas reservoir C to the outlet of adsorber B through a valve 11. At this point of time, in adsorber A, desorption has been already started by reducing pressure from the inlet thereof through a valve 4 with the vacuum pump. The difference between both adsorbers is drawing to zero in due time.

Step-5

While the oxygen enriched gas is continuously flowed backward from the gas reservoir C to suppress break-through of nitrogen gas in the adsorbent of adsorber B toward the outlet, the mixed gas is introduced to the inlet of adsorber B through a valve 6 by a blower 1 to effect pressurization as a pretreatment of the adsorption step.

The above steps are repeatedly carried out as ½ cycle for about 50 to 70 seconds.

(2) High pressure process

Another preferred embodiment of the operation steps is explained with reference to FIGS. 2 and 4a to 4e.

Step-1

The mixed gas is pressurized to 4 kg/cm$^2$G with a compressor 1 and introduced into adsorber A packed with zeolite molecular sieve through the valve 3. Then, nitrogen gas is adsorbed to enrich oxygen gas and the resulting oxygen enriched gas is accumulated in a gas reservoir C through a valve 9. On the other hand, adsorber B wherein adsorption has been completed is released to the atmospheric pressure through a valve 7 and desorbed to regenerate the adsorbent.

Step-2

For about 10 to 30 seconds at the end of the desorption step in adsorber B, it is rinsed by flowing backward a part of the oxygen enriched product gas from the gas reservoir C in the flow rate of 1.2 to 3.5 times as much as that of the oxygen enriched product gas which is drawn from the gas reservoir C as the product gas through valves 13 and 12.

Step-3

A part of the residual oxygen enriched gas in adsorber A wherein adsorption has been completed is recovered to the outlet of adsorber B through valves 10 and 11. At this time, the pressure of adsorber B is still being released to desorb nitrogen. It is required to carry out recovery so that the pressure of the adsorber is controlled up to 0.5 kg/cm$^2$G, that is, the pressure is raised from the atmosphere by 0.5 kg/cm$^2$G. When recovery is effected until this pressure increment exceeds 0.5 kg/cm$^2$G, the excess nitrogen gas flows into adsorber B from adsorber A and it is adsorbed to the adsorbent at a proximal part to the outlet of adsorber B to contaminate the adsorbent in adsorber B. Therefore, this is not preferred because oxygen concentration of the oxygen enriched gas is caused to be lowered in the subsequent steps.

Step-4

The residual oxygen enriched gas in adsorber A is recovered to the inlet of adsorber B through valves 10 and 8.

At the same time, a part of the oxygen enriched product gas is flowed backward from the gas reservoir C to the outlet of adsorber B through a valve 11. At this time, in adsorber A, desorption has been already started by releasing pressure from the inlet thereof to the atmosphere through a valve 3. The difference between both adsorbers is drawing near to zero in due time.

Step-5

The oxygen enriched gas is continuously flowed backward from the gas reservoir C to suppress breakthrough of nitrogen gas in the adsorbent of adsorber B to its outlet. When gas recovery from adsorber A has been completed, the mixed gas is introduced to the inlet of adsorber B through a valve 6 by a compressor 1 to effect pressurization as a pretreatment of the adsorption step.

The above steps are repeatedly carried out as ½ cycle for about 50 to 70 seconds.

For each of the low pressure process and the high pressure process the steps are described for the half of the cycle of operation where adsorber A is used to produce oxygen-enriched gas and adsorber B is regenerated (i.e., nitrogen is desorbed). In the other half of the cycle adsorber B is used to produce oxygen-enriched gas and adsorber A is regenerated and valve operation is varied to carry out the steps to effect this. For example, in the operations described above where adsorber A is used to produce oxygen enriched gas, valves 7 and 8 are used respectively to obtain desorption and pressure equalization. On the other hand where adsorber B is used to produce oxygen enriched gas, valves 4 and 5 are used respectively to obtain desorption and pressure equalization.

According to a conventional PSA, three or more adsorbers are required to obtain an oxygen enriched gas having oxygen concentration of 90% or more in a high yield. However, according to the present invention, by using even two adsorbers, it is possible to obtain an oxygen enriched gas having high oxygen concentration in a high yield and, therefore, the apparatus can be simplified. Further, the amount of the adsorbent can be reduced to ⅔ of that used in a conventional three adsorber process. Accordingly, the plant costs can be remarkably reduced. Particularly, according to the present invention, oxygen concentration and yield of the product gas are remarkably improved in comparison with a conventional technique such as that disclosed in Japanese Patent Kokai No. 59-199503 wherein two adsorbers are employed. For example, oxygen concentration is increased from 45% in Japanese Patent Kokai No. 59-199503 to 93% in the present invention and the yield is increased from 35% in the former to 55% in the latter.

The following Examples and Comparative Examples further illustrate the present invention in detail but are not to be construed to limit the scope thereof.

EXAMPLE 1

5A type zeolite molecular sieve manufactured by Bayer GmbH, in West Germany was packed in two adsorbers of 80 mm in diameter and 1200 mm in height, respectively, and one gas reservoir tank of 80 mm in diameter and 1200 mm in height which had the same volume as that of the adsorber was provided at the outlet of the adsorber. Air pressurized to 500 mmHg by a blower was introduced into the adsorber and then the operation was carried out according to the steps as shown in FIGS. 3a to 3e. The operation was carried out for 120 seconds (60 sec/1 cycle ×2) according to the following time cycle.

| | |
|---|---|
| Step-1 | 19 seconds |
| Step-2 | 20 seconds |
| Step-3 | 3 seconds |
| Step-4 | 3 seconds |
| Step-5 | 15 seconds |
| Total | 60 seconds |

Desorption was effected until the final desorption pressure reached to 180 mmHg within 60 seconds by a vacuum pump. In step-2, the adsorber was rinsed for 20 seconds by flowing backward a part of the oxygen enriched product gas from the gas reservoir in the flow rate of 370 Nl/H to the adsorber wherein desorption was being continued. In step-3, the pressure of the adsorber wherein desorption was being continued was raised and reached to 280 mmHg. In step-4, the pressures of two adsorbers were reached to almost the same pressure, i.e., 530 mmHg. As the result, an oxygen enriched gas having oxygen concentration of 93.3% was obtained in the flow rate of 131 Nl/H and yield of the recovered oxygen gas was 55.2%.

COMPARATIVE EXAMPLE 1

According to the same manner as described in Example 1, the operation was repeated using the same adsorber and the adsorbent of Example 1 except that the gas reservoir was not incorporated into the apparatus. Desorption was carried out until the final desorption pressure reached to 180 mmHg within 60 seconds with the vacuum pump. In step-2, the adsorber was rinsed for 20 seconds by flowing backward a part of the oxygen enriched product gas drawn from the piping installed at the outlet of the adsorber in the flow rate of 372 Nl/H, while desorption was being continued. In step-3, the pressure of the adsorber wherein desorption was being continued was raised and reached to 280 mmHg. In step-4, the pressure thereof was reached to 610 mmHg in the depressurized adsorber and to 460 mmHg in the pressurized adsorber, because a part of the oxygen enriched product gas was not flowed backward from the gas reservoir and the pressures of both adsorbers were not equalized as in Example 1. As the result, oxygen concentration of the oxygen enriched product gas was decreased to 91.2%, the flow rate of the oxygen enriched product gas was decreased to 120 Nl/H. The yield of the recovered oxygen enriched gas was 49%.

EXAMPLE 2

5A type zeolite molecular sieve manufactured by Bayer GmbH in West Germany was packed in two adsorbers of 80 mm in diameter and 1200 mm in height, respectively, and one gas reservoir tank of 80 mm in diameter and 1200 mm in height having the same volume as that of the adsorber was provided at the outlet side of the adsorption unit. Feed air pressurized to 4.0 kg/cm²G was introduced into the adsorber and then the operation was carried out according to the steps as shown in FIGS. 4a to 4e. The operation was carried out for 120 seconds (60 sec/1 cycle x 2) according to the following time cycle.

| | |
|---|---|
| Step-1 | 22 seconds |
| Step-2 | 20 seconds |
| Step-3 | 0.5 second |

| | |
|---|---|
| -continued | |
| Step-4 | 2.5 seconds |
| Step-5 | 15 seconds |
| Total | 60 seconds |

Desorption gas was released to the atmosphere by opening one valve at the bottom of the adsorber. In step-2, the adsorber was rinsed for 20 seconds by flowing backward a part of the oxygen enriched product gas from the gas reservoir in the flow rate of 282 Nl/H to the adsorber wherein desorption was being continued. In step-3, the pressure of the adsorber wherein desorption was being continued was raised and reached to 0.2 kg/cm$^2$G. In step-4, the pressures of two adsorbers were equalized to 2.0 kg/cm$^2$G. As the result, the oxygen enriched product gas having oxygen concentration of 93.5% was obtained in the flow rate of 95 Nl/H and the yield of the recovered oxygen gas was 25%.

COMPARATIVE EXAMPLE 2

According to the same manner as described in Example 2, the operation was carried out by using the same adsorbers and the adsorbent of Example 2 except that the gas reservoir tank was not incorporated into the apparatus. Desorption gas was released to the atmosphere by opening one valve at the bottom of the adsorber. In step-2, the adsorber was rinsed for 20 seconds by flowing backward a part of the oxygen enriched product gas drawn from the piping installed at the outlet of the adsorber in the flow rate of 282 Nl/H to the adsorber wherein desorption was being continued. In step-3, the pressure of the adsorber wherein desorption was being continued was raised and reached to 0.2 kg/cm$^2$G. In step-4, the pressure thereof was reached to 2.4 kg/cm$^2$G in the depressurized adsorber and to 1.2 kg/cm$^2$G in the pressurized adsorber because a part of the oxygen enriched product gas was not flowed backward from the gas reservoir tank. Therefore, the pressures of both adsorbers were not equalized as in Example 1. As the result, oxygen concentration of the oxygen enriched product gas was decreased to 88.5% and the flow rate of the oxygen enriched product gas was decreased to 90 Nl/H. The yield of the recovered oxygen gas was decreased to 21%.

EXAMPLE 3

5A type zeolite molecular sieve manufactured by Bayer GmbH in West Germany was packed in two adsorbers of 80 mm in diameter and 1200 mm in height, respectively, and one gas reservoir tank of 80 mm in diameter and 1200 mm in height having the same volume as that of the adsorber was provided at the outlet of the adsorber. Feed air pressurized to 4.0 kg/cm$^2$G was introduced into the adsorber unit and then the operation was carried out for 120 seconds (60 sec/1 cycle ×2) by the steps 1, 2, 4 and 5 shown in FIGS. 4a, 4b, 4d and 4e with omitting the step-3 according to the following time cycle.

| | |
|---|---|
| Step-1 | 22.5 seconds |
| Step-2 | 20 seconds |
| Step-4 | 2.5 seconds |
| Step-5 | 15 seconds |
| Total | 60 seconds |

Desorption gas was released in the atmosphere by opening one valve at the bottom of the adsorber. In step-2, the adsorber was rinsed for 20 seconds by flowing backward a part of the oxygen enriched gas from the gas reservoir tank in the flow rate of 282 Nl/H to the adsorber wherein desorption was being continued. In step-4, the pressures of two adsorbers were reached to 2.0 kg/cm$^2$G and almost equalized. As the result, the oxygen enriched product gas having oxygen concentration of 93.6% was obtained in the flow rate of 91 Nl/H and the yield of the recovered oxygen gas was 24%.

What is claimed is:

1. A process for recovering an oxygen enriched gas from a mixed gas mainly composed of nitrogen gas and oxygen gas by means of PSA which comprises:
    providing two adsorbers A and B packed with zeolite molecular sieve as the adsorbant and a gas reservoir for accumulating the recovered oxygen enriched gas which is connected to the outlet of each adsorber and used in common, introducing the mixed gas into adsorber A at a pressure of atmospheric pressure to less than 2 kg/cm$^2$G to adsorb nitrogen gas, and desorbing nitrogen gas previously adsorbed in adsorber B therefrom under a pressure of between 100 mmHG to 400 mmHg,
    introduction, adsorption and desorption being carried out according to the following six steps:
    (1) introducing the mixed gas through the inlet of adsorber A and selectively adsorbing nitrogen gas, while accumulating the resulting oxygen enriched gas in the reservoir through the outlet of adsorber A;
    (2) desorbing nitrogen gas through the inlet of adsorber B with a vacuum pump;
    (3) flowing a part of the oxygen enriched gas in the reservoir for rinsing backward to the outlet of adsorber B wherein desorption of nitrogen gas is being continued;
    (4) stopping introduction of the mixed gas into adsorber A, and thereafter introducing a part of the residual oxygen enriched gas in adsorber A into the outlet of adsorber B through the outlet of adsorber A to recover the oxygen enriched gas;
    (5) introducing another part of the residual oxygen enriched gas in adsorber A into the inlet of adsorber B wherein desorption has been completed through the outlet of adsorber A to recover the oxygen enriched gas, while flowing a part of the oxygen enriched gas backward to the outlet of adsorber B to accumulate pressure; and
    (6) flowing a part of the oxygen enriched gas backward to the outlet of adsorber B, while introducing the mixed gas into the inlet of adsorber B to effect pressurization, and
    repeating the above six steps in turn with alternation of adsorbers A and B.

2. The process according to claim 1, wherein pressure increment of adsorber B at the recovering step (4) is 200 mmHg or less, and the difference of pressure between adsorbers A and B after the pressure accumulating step (5) has been completed is substantially zero.

3. A process for recovering an oxygen enriched gas from a mixed gas mainly composed of nitrogen gas and oxygen gas by means of PSA which comprises:
    providing two adsorbers A and B packed with zeolite molecular sieve as the adsorbent and a gas reservoir for accumulating the recovered oxygen enriched gas which is connected to the outlet of each adsorber and used in common, introducing the mixed gas into adsorber A at a pressure of 2 to 8 kg/cm$^2$G to adsorb nitrogen gas, and desorbing nitrogen gas previously adsorbed in adsorber B therefrom to the atmospheric pressure, introduction, adsorption and desorption being carried out according to the following six steps:

(1) introducing the mixed gas through the inlet of adsorber A and selectively adsorbing nitrogen gas, while accumulating the resulting oxygen enriched gas in the reservoir through the outlet of adsorber A;

(2) desorbing nitrogen gas through the inlet of adsorber B;

(3) flowing a part of the oxygen enriched gas in the reservoir for rinsing backward to the outlet end of adsorber B wherein desorption of nitrogen gas is being continued;

(4) stopping introduction of the mixed gas into adsorber A, and thereafter introducing a part of the residual oxygen enriched gas in adsorber A into the outlet of adsorber B through the outlet of adsorber A to recover the oxygen enriched gas;

(5) introducing another part of the residual oxygen enriched gas in adsorber A into the inlet of adsorber B wherein desorption has been completed through the outlet of adsorber A to recover the oxygen enriched gas, while flowing a part of the oxygen enriched gas backward to the outlet of adsorber B to accumulate pressure; and (6) flowing a part of the oxygen enriched gas backward to the outlet of adsorber B, while introducing the mixed gas into the inlet of adsorber B to effect pressurization, and repeating the above six steps in turn with alternation of adsorbers A and B.

4. The process according to claim 3, wherein pressure increment of adsorber B at the recovering step (4) is 0.5 kg/cm$^2$G or less, and the difference of pressure between adsorbers A and B after the pressure accumulating step (5) has been completed is substantially zero.

5. The process according to any one of claims 1 to 4, wherein the mixed gas composed of as a main component nitrogen and oxygen gases is air.

6. The process according to claim 1 or 3, wherein one gas reservoir tank of oxygen enriched gas is provided and the volume thereof is at least half as much as that of one adsorber.

7. A process for recovering an oxygen enriched gas from a mixed gas mainly composed of nitrogen gas and oxygen gas by means of PSA which comprises:

providing two adsorbers A and B packed with zeolite molecular sieve as the adsorbant and a gas reservoir for accumulating the recovered oxygen enriched gas which is connected to the outlet of each adsorber and used in common, introducing the mixed gas into adsorber A at a pressure of atmospheric pressure to less than 2 kg/cm$^2$G to adsorb nitrogen gas, and desorbing nitrogen gas previously adsorbed in adsorber B therefrom under a pressure of between 100 mmHg to 400 mmHg, introduction, adsorption and desorption being carried out according to the following five steps:

(1) introducing the mixed gas through the inlet of adsorber A and selectively adsorbing nitrogen gas, while accumulating the resulting oxygen enriched gas in the reservoir through the outlet of adsorber A;

(2) desorbing nitrogen gas through the inlet of adsorber B with a vacuum pump;

(3) flowing a part of the oxygen enriched gas in the reservoir for rinsing backward to the outlet of adsorber B wherein desorption of nitrogen gas is being continued;

(4) introducing residual oxygen enriched gas in adsorber A into the inlet of adsorber B wherein desorption has been completed through the outlet of adsorber A to recover the oxygen enriched gas, while flowing a part of the oxygen enriched gas backward to the outlet of adsorber B to accumulate pressure; and (5) flowing a part of the oxygen enriched gas backward to the outlet of adsorber B, while introducing the mixed gas into the inlet of adsorber B to effect pressurization, and repeating the above five steps in turn with alternation of adsorbers A and B.

8. A process for recovering an oxygen enriched gas from a mixed gas mainly composed of nitrogen gas and oxygen gas by means of PSA which comprises:

providing two adsorbers A and B packed with zeolite molecular sieve as the adsorbent and a gas reservoir for accumulating the recovered oxygen enriched gas which is connected to the outlet of each adsorber and used in common, introducing the mixed gas into adsorber A at a pressure of 2 to 8 kg/cm$^2$G to adsorb nitrogen gas, and desorbing nitrogen gas previously adsorbed in adsorber B therefrom to the atmospheric pressure, introduction, adsorption and desorption being carried out according to the following five steps:

(1) introducing the mixed gas through the inlet of adsorber A and selectively adsorbing nitrogen gas, while accumulating the resulting oxygen enriched gas in the reservoir through the outlet of adsorber A;

(2) desorbing nitrogen gas through the inlet of adsorber B;

(3) flowing a part of the oxygen enriched gas in the reservoir for rinsing backward to the outlet end of adsorber B wherein desorption of nitrogen gas is being continued;

(4) introducing residual oxygen enriched gas in adsorber A into the inlet of adsorber B wherein desorption has been completed through the outlet of adsorber A to recover the oxygen enriched gas, while flowing a part of the oxygen enriched gas backward to the outlet of adsorber B to accumulate pressure; and (5) flowing a part of the oxygen enriched gas backward to the outlet of adsorber B, while introducing the mixed gas into the inlet of adsorber B to effect pressurization, and repeating the above five steps in turn with alternation of adsorbers A and B.

* * * * *